(12) United States Patent
Fukahori et al.

(10) Patent No.: US 11,323,796 B2
(45) Date of Patent: May 3, 2022

(54) WIRELESS EARPHONE

(71) Applicant: PANASONIC INTELLECTUAL PROPERTY MANAGEMENT CO., LTD., Osaka (JP)

(72) Inventors: Takashi Fukahori, Fukuoka (JP); Ryota Fujiwara, Fukuoka (JP); Toshinori Komesu, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 35 days.

(21) Appl. No.: 16/985,534

(22) Filed: Aug. 5, 2020

(65) Prior Publication Data

US 2021/0044885 A1    Feb. 11, 2021

(30) Foreign Application Priority Data

Aug. 9, 2019  (JP) .............................. JP2019-147391

(51) Int. Cl.
| | |
|---|---|
| *H04R 1/10* | (2006.01) |
| *G06F 3/044* | (2006.01) |
| *G06F 3/16* | (2006.01) |
| *H01Q 1/27* | (2006.01) |
| *H01Q 9/42* | (2006.01) |
| *H04R 1/02* | (2006.01) |

(52) U.S. Cl.
CPC ........... *H04R 1/1041* (2013.01); *G06F 3/044* (2013.01); *G06F 3/165* (2013.01); *H01Q 1/273* (2013.01); *H01Q 9/42* (2013.01); *H04R 1/1016* (2013.01); *H04R 2420/07* (2013.01)

(58) Field of Classification Search
CPC ................ H04R 1/1041; H04R 1/1016; H04R 2420/07; G06F 3/044; G06F 3/165; H01Q 1/273; H01Q 9/42

USPC ..................................................... 381/74, 333
See application file for complete search history.

(56) References Cited

U.S. PATENT DOCUMENTS

| | | |
|---|---|---|
| 8,655,000 B1 | 2/2014 | Solum et al. |
| 10,375,463 B1 | 8/2019 | Kocubinski et al. |
| 2010/0056096 A1* | 3/2010 | Koerner .............. H04M 1/6058 455/334 |

(Continued)

FOREIGN PATENT DOCUMENTS

JP    UM-U-3192879 A    8/2014

OTHER PUBLICATIONS

The Extended European Search Report dated Dec. 23, 2020, for the corresponding European Patent Application No. 20189420.1, 10 pages.

*Primary Examiner* — Ammar T Hamid
(74) *Attorney, Agent, or Firm* — Seed IP Law Group LLP

(57) ABSTRACT

A wireless earphone includes: a sensor which serves as both of an antenna configured to transmit and receive a radio signal wirelessly to and from an external device and a pad configured to receive an input manipulation of a wearer; a radio circuit configured to perform various kinds processing relating to the radio signal; and a control circuit configured to perform various kinds processing on the basis of the input manipulation. The wireless earphone further includes a capacitance element connected between the radio circuit and the sensor and between the control circuit and the sensor, the capacitance element being connected to a ground conductor in series to pass only the radio signal.

20 Claims, 12 Drawing Sheets

(56) References Cited

U.S. PATENT DOCUMENTS

| | | | |
|---|---|---|---|
| 2013/0217342 A1* | 8/2013 | Abdul-Gaffoor | .... H03K 17/962 |
| | | | 455/77 |
| 2014/0313688 A1* | 10/2014 | Colahan | .............. B29C 45/1671 |
| | | | 361/818 |
| 2017/0359644 A1* | 12/2017 | Cramer | ................ H04R 1/1008 |

* cited by examiner

FIG. 3
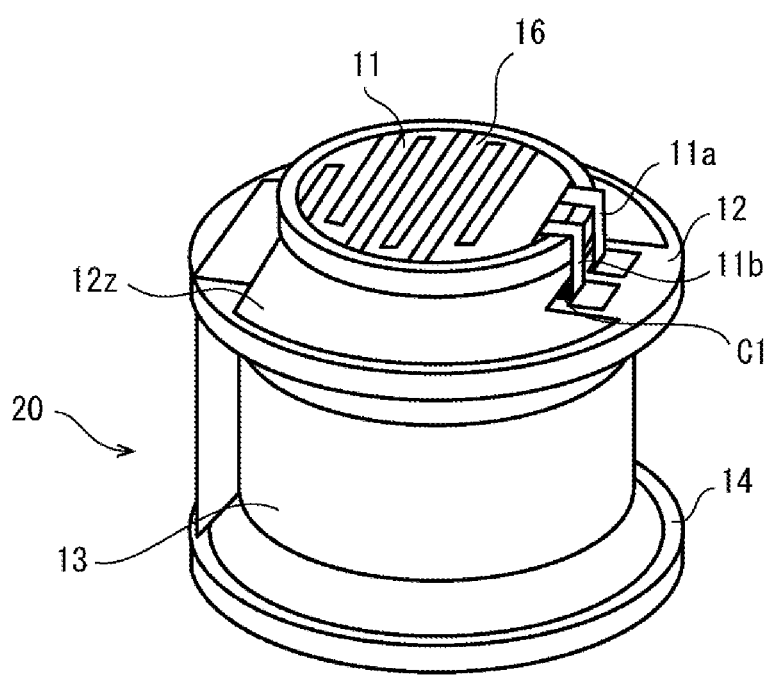
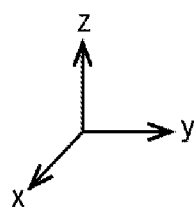

FIG. 9
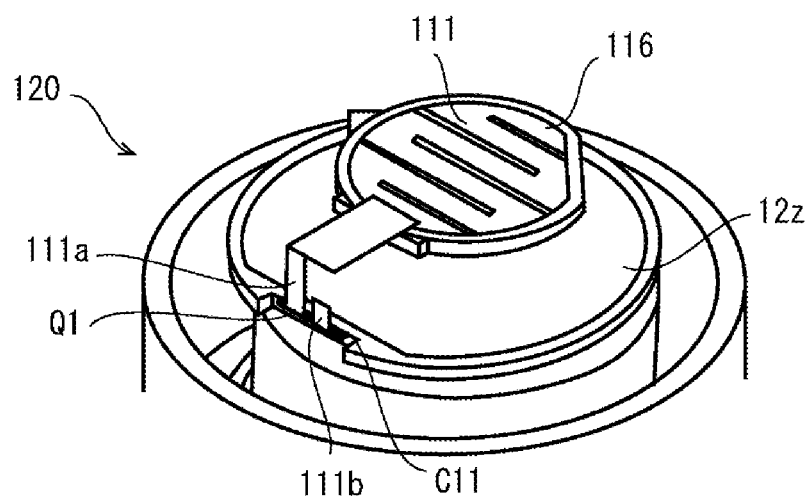
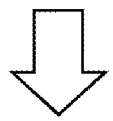
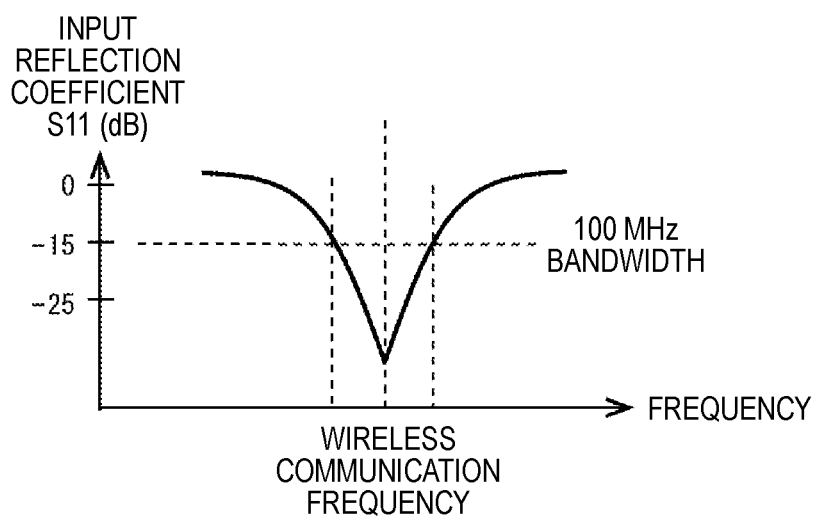

FIG. 10
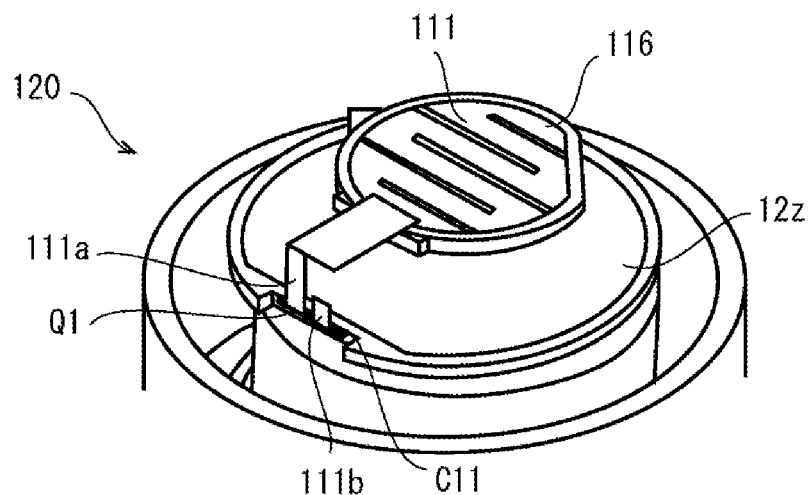
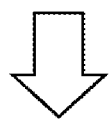
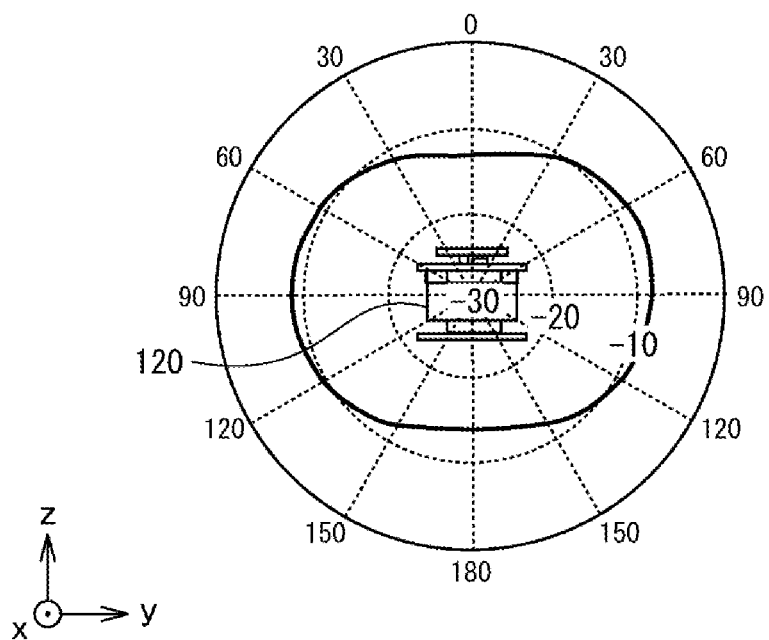

FIG. 11
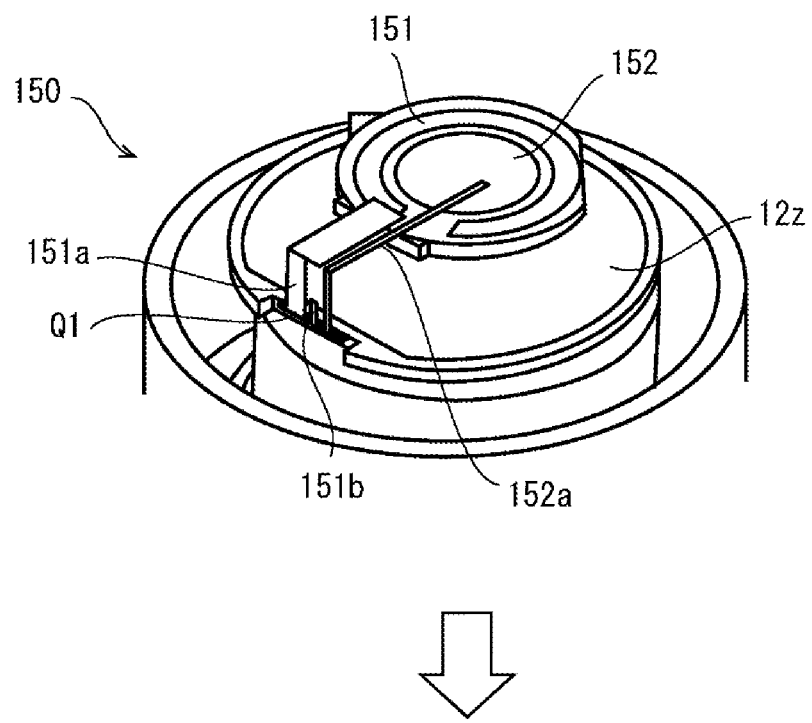
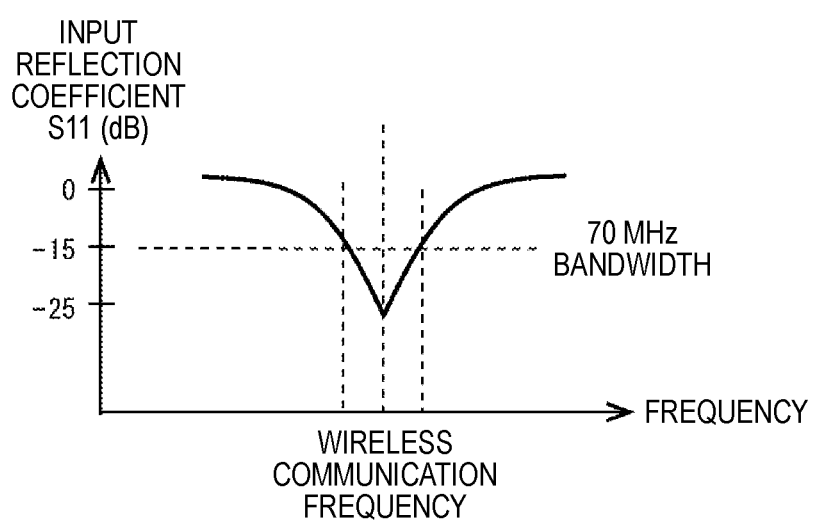

FIG. 12
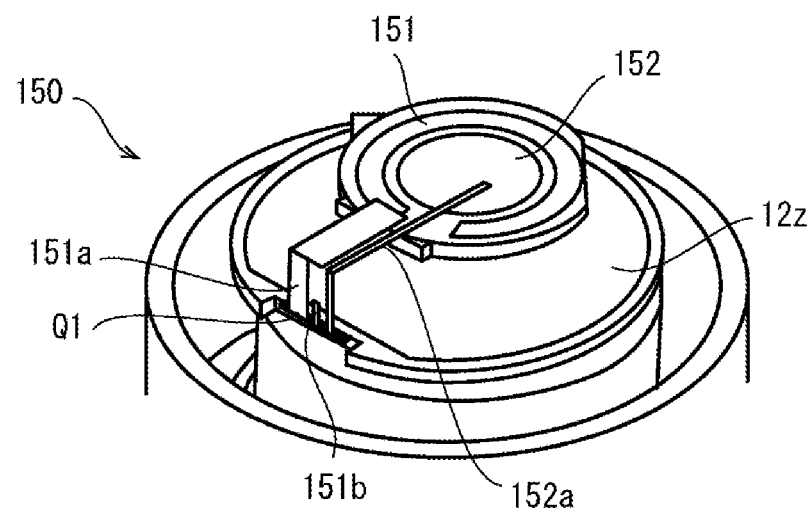
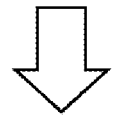
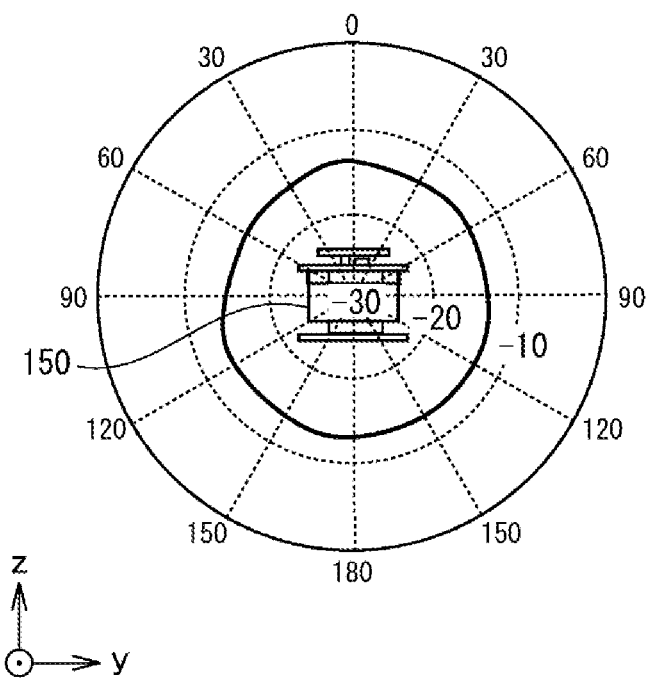

WIRELESS EARPHONE

CROSS-REFERENCE TO RELATED APPLICATIONS

This application is based on and claims priority to Japanese Patent Application No. 2019-147391 filed on Aug. 9, 2019, the entire contents of which are incorporated herein by reference.

FIELD

The present disclosure relates to a wireless earphone.

BACKGROUND

JP-U-3192879 discloses a headphone that includes a headband portion, earphone portions, and a detection unit. Each earphone portion is positioned with respect to an end portion of the headband portion and joined to it rotatably by a joining structure. The detection unit includes a pressure sensor which has a detection surface. When the headphones are left unused, a gap exists between the detection surface and a headphone internal structure. On the other hand, when the headphones are set around the head of a user, the headphone internal structure is deformed or moved, whereby the gap disappears and the pressure sensor is pressed. The headphones detect whether they are in an unused state by the pressure sensor, and reads an instruction when receiving a resulting signal. JP-U-3192879 also discloses that the headphones may be provided with an antenna module that performs wireless transmission and reception with the pressure sensor.

SUMMARY

However, in JP-U-3192879, no detailed study has been made of how to arrange the pressure sensor and the antenna module and it is assumed that they are disposed as separate units. Thus, when it is intended to apply the configuration of JP-U-3192879 to wireless earphones that perform wireless communication with a portable music player (e.g., smartphone) being gripped by a user, problems arise that the number of components and the number of assembling steps of each wireless earphone is increased. Considering a feature that each wireless earphone is inserted into an ear (e.g., external ear) of a user, there is room for improvement in that it is desired to arrange, efficiently, a wireless communication module and a sensor capable of detecting a manipulation of the user in a limited space in the case of each wireless earphone.

The concept of the present disclosure has been conceived view of the above circumstances, and an object of the invention is therefore to provide a wireless earphone that makes it possible to provide a wireless communication module and a touch sensor as a single component in a limited space in the case of the wireless earphone and to thereby suppress increase of the number of components and the number of assembling steps of it.

The disclosure provides a wireless earphone comprising a sensor which serves as both of an antenna configured to transmit and receive a radio signal wirelessly to and from an external device and a pad configured to receive an input manipulation of a wearer; a radio circuit configured to perform various kinds processing relating to the radio signal; a control circuit configured to perform various kinds processing on the basis of the input manipulation; and a capacitance element connected between the radio circuit and the sensor and between the control circuit and the sensor, the capacitance element being connected to a ground conductor in series to pass only the radio signal.

The disclosure allows a wireless communication module and a touch sensor to be provided as a single component in a limited space in the case of a wireless earphone and can suppress increase of the number of components and the number of assembling steps of it.

BRIEF DESCRIPTION OF DRAWINGS

FIG. 3 is a perspective view showing an example appearance of an earphone unit;

FIG. 9 is a perspective view and a graph showing an example appearance and an example characteristic of an earphone unit according to Modification of the first embodiment;

FIG. 10 shows an example directivity characteristic of an antenna element shown in FIG. 9;

FIG. 11 is a perspective view and a graph showing an example appearance and an example characteristic of an earphone unit according to Comparative Example 2; and FIG. 12 shows an example directivity characteristic of the antenna element shown in FIG. 11.

DETAILED DESCRIPTION

Figure 1:
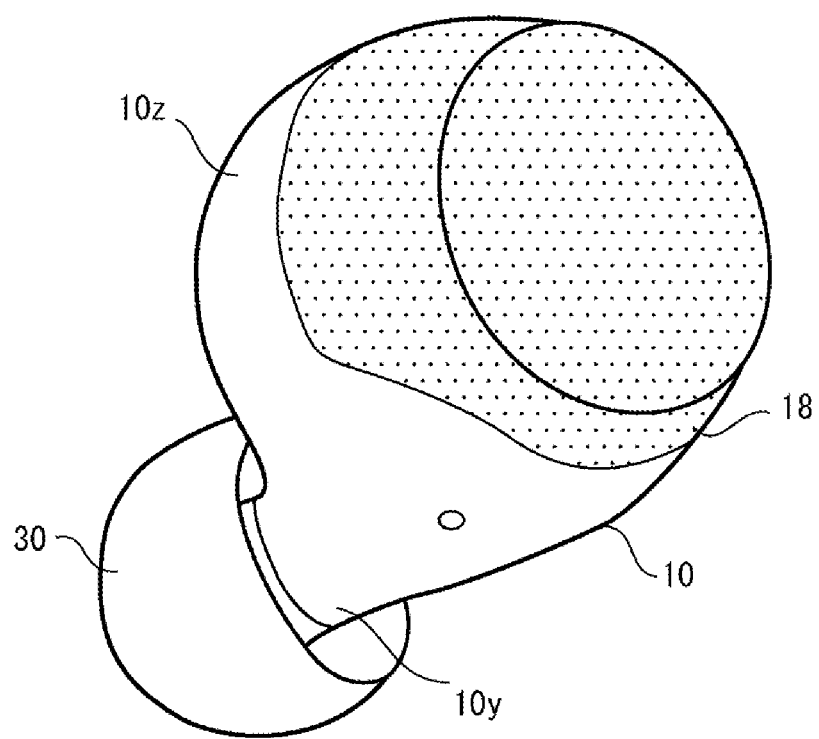
FIG. 1 is a perspective view showing an example appearance of a wireless earphone according to a first embodiment.

An embodiment as a specific disclosure of a wireless earphone according to the present disclosure will be described in detail by referring to the drawings when necessary. However, unnecessarily detailed descriptions may be avoided. For example, detailed descriptions of already well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

FIG. 1 is a perspective view showing an example appearance of a wireless earphone 5 according to the first embodiment. The wireless earphone 5 is set in an ear hole (e.g., external ear) of a user (an example of a term "wearer") of the earphone 5 and receives audio data (e.g., musical data) that is transmitted wirelessly (by a short-range wireless communication using, for example, Bluetooth (registered trademark)) from an external device such as a smartphone or a portable music player being held by the user. The wireless earphone 5 outputs a sound on the basis of the received audio data. While not in use, the wireless earphone 5 is placed on a cradle (not shown). If the wireless earphone 5 is put on the cradle at a prescribed placement position in the case where, for example, a battery (secondary battery 13) incorporated in the wireless earphone 5 is not charged fully, the battery (secondary battery 13) is charged by power that is transmitted from the cradle.

The wireless earphone 5 is composed of an earphone main body 10 and a sleeve 30. The earphone main body 10 has a pot-shaped case 10z that is formed with a tubular portion 10y as a bottom portion. The case 10z is shaped using a hard resin such as a silicone resin or foamed urethane. The case 10z is divided into an inside portion including the tubular portion 10y and the other portion, that is, an outside portion.

The inside portion of the case 10z is left as shaped using the hard resin. The outside portion of the case 10z is provided with an exterior 18 in such a manner that discontinuous evaporation metal, for example, is formed on the hard resin surface. An example of the discontinuous evaporation metal is indium. The exterior 18 (discontinuous evaporation metal) which is formed on the outside portion of the case 10z is a dielectric rather than a conductor such as a metal. That is, though having a metallic gloss that is superior in aesthetic appearance (design), the exterior 18 is a dielectric in an electromagnetic sense and hence does not impair the antenna performance (described later).

The sleeve 30, which is shaped so as to cover the tubular portion 10y, is a member that is set in an earhole of a user when the wireless earphone 5 is used. The sleeve 30 is made of an elastic member (e.g., silicone rubber) so as to be set in an earhole of a user easily. The sleeve 30 can be detached from the earphone main case 10 for replacement.

Figure 2:
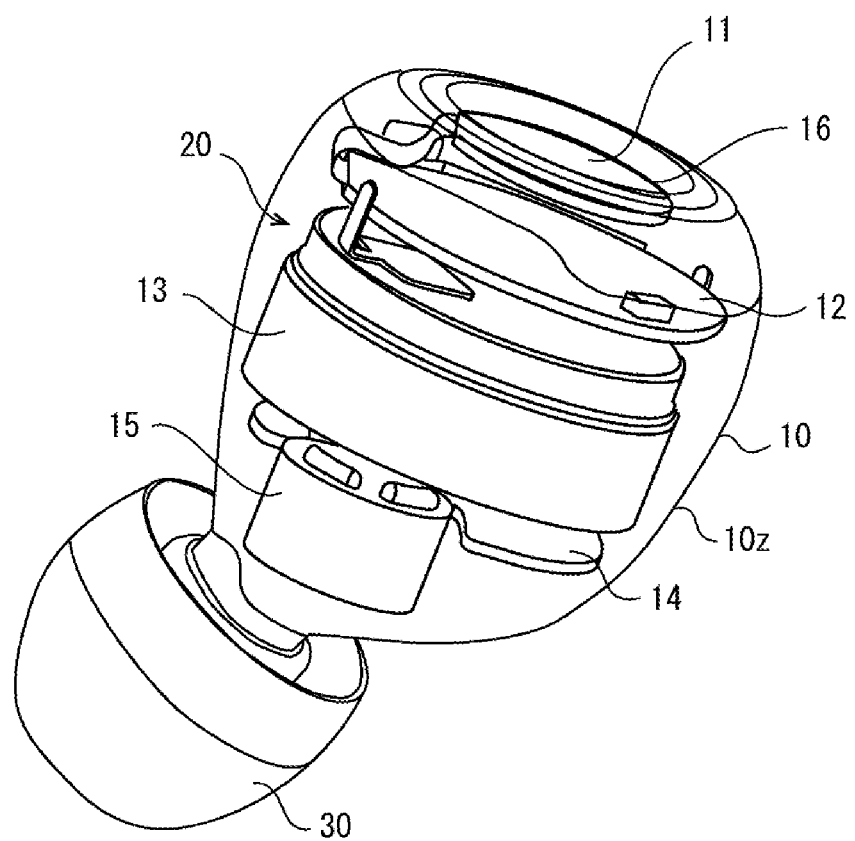
FIG. 2 is a perspective view showing an example inside structure of a case.

FIG. 2 is a perspective view showing an example inside structure of the case 10z. An earphone unit 20 is housed in the case 10z. The earphone unit 20 is configured in such a manner that an antenna/sensor unit 16, a top board 12, a secondary battery 13, a bottom board 14, and a speaker 15 are laid stepwise one on another.

The antenna/sensor unit 16 which is an example of a term "sensor unit" serves as both of an antenna element 11 (an example of a term "antenna unit") having a wireless communication function of the wireless earphone 5 and a sensor element 11z (see FIG. 4; an example of a term "pad unit") having a touch sensor function for detecting a user input manipulation (e.g., touch manipulation). The antenna element 11 includes an antenna conductor that radiates a radio signal (e.g., radio waves) that is transmitted or received by the wireless communication function. The sensor element 11z is an electrode of a capacitive touch sensor, for example.

The top board 12 is a dielectric that is formed with prescribed circuit patterns. The top board 12 is provided with electronic components such as a wireless communication circuit 31 (see FIG. 4), a touch sensor control circuit 33 (see FIG. 4), and a processor (not shown). One surface (top surface in FIG. 4), opposed to the antenna/sensor unit 16, of the top board 12 is formed with a ground conductor 12z (see FIG. 3). The processor (not shown) which serves as a control unit of the wireless earphone 5, controls, in a centralized manner, various kinds processing that are performed using input data or information.

The wireless communication circuit 31, which is an example of a term "radio circuit," receives a radio signal (radio waves) of audio data transmitted from the external device when the user listens to, for example, a musical piece reproduced by the external device. The wireless communication circuit 31 performs expansion (restoration) processing, digital-to-analog conversion processing, demodulation processing for down conversion from a radio frequency band (RF band) to a baseband (BB), and baseband signal processing on the received radio signal (i.e., audio data compressed by the external device) and outputs resulting audio data to the speaker 15. Furthermore, when the user is to manipulate the external device by a touch manipulation (e.g., to make a volume increase or decrease control instruction), the wireless communication circuit 31 performs modulation processing on control data recognized by the touch sensor control circuit 33 and transmits resulting control data to the external device in the form of radio waves.

The touch sensor control circuit 33 which is an example of a term "control circuit" controls the capacitive touch sensor. The touch sensor control circuit 33 detects a capacitance between the antenna/sensor unit 16 and the ground conductor 12z and detects, on the basis of a variation of the detected capacitance value, whether part of a human body (e.g., a finger of the user) is in contact with or close to the antenna/sensor unit 16. Furthermore, the touch sensor control circuit 33 recognize, on the basis of a capacitance variation pattern, an instruction of a touch manipulation made by a user finger, for example, and outputs control data corresponding to a recognition result to the wireless communication circuit 31.

The bottom board 14 is provided with an interface circuit for interfacing with the speaker 15, a connection terminal for connection to the cradle (not shown), etc.

The secondary battery 13 is a power source of the wireless earphone 5. The secondary battery 13 is brought into contact with (i.e., connected to) a charging terminal of the cradle (not shown) via the connection terminal provided in the bottom board 14. Incorporating a charger, the cradle receives power from a commercial power source via an AC adaptor and charges the secondary battery 13. Although in the first embodiment the charging is performed by contact power supplying via the connection terminal, it may be performed wireless power supplying that does not use a connection terminal. The secondary battery 13 may be, for example, a lithium ion battery, in which case the wireless earphone 5 can be used for about five to six hours by charging of one time. Another example of the secondary battery 13 is a nickel-hydrogen battery. A primary battery may be used in place of the secondary battery 13.

The speaker 15 outputs, as a sound, audio data (e.g., musical data) that is transmitted wirelessly from the external device. Inside the case 10z, the front surface (in other words, sound emitting surface) of the speaker 15 is directed to the tubular portion 10y which is covered with the sleeve 30. As a result, audio data (e.g., musical data) that is output as a sound from the speaker 15 is transmitted through the earhole (e.g., external ear) of the user inward to the inner ear and the eardrum to allow the user to listen to and enjoy the musical data.

FIG. 3 is a perspective view showing an example appearance of the earphone unit 20. The antenna/sensor unit 16 assumes a disc shape, for example. The antenna/sensor unit 16 is disposed close to the inner surface of a portion, exposed outside the external ear of the user when the wireless earphone 5 is set in the earhole (e.g., external ear) of the user, of the case 10z.

The antenna element 11 assumes a zigzagged meander line on the surface of the antenna/sensor unit 16. By forming a meander line, the antenna element 11 can be given an antenna element length suitable for it (e.g., ¼ times the wavelength of radio waves corresponding to a frequency in an assumed operation frequency band of the wireless earphone 5). Although the antenna conductor is shaped into a line (meander line), the antenna element 11 can be given a touch area capable of securing touch electrode performance effectively (i.e., a surface area large enough to be touched by a user finger easily).

For example, the surface of the antenna/sensor unit 16 may assume either a true circle or an ellipse. Alternatively, the surface of the antenna/sensor unit 16 may be rectangular, in which case the antenna element 11 assumes a zigzagged meander line that is uniform in width.

Where the antenna/sensor unit 16 functions as a touch sensor, following manipulations, for example, are performed as touch manipulations on the antenna/sensor unit 16 by a user finger, for example. When a short-time touch manipulation is performed, the wireless earphone 5 may instruct the external device to perform one of playback of a musical piece, a stop of a musical piece, tune forwarding, tune returning, etc. of a musical piece. When a long-time touch manipulation is performed, the wireless earphone 5 may command, for example, a pairing operation for performing a wireless communication of, for example, Bluetooth (registered trademark) with the external device such as a smartphone.

In this specification, the X axis, Y axis, and Z axis are defined as shown in FIG. 3. That is, as shown in FIG. 3, the x coordinate is a coordinate in the X axis that is parallel with the surface on which the antenna conductor is formed. The y coordinate is a coordinate in the Y axis that is parallel with the surface on which the antenna conductor is formed and is perpendicular to the X axis. The z coordinate is a coordinate in the Z axis that is perpendicular to the X-Y plane that is the surface on which the antenna conductor is formed.

Figure 4:
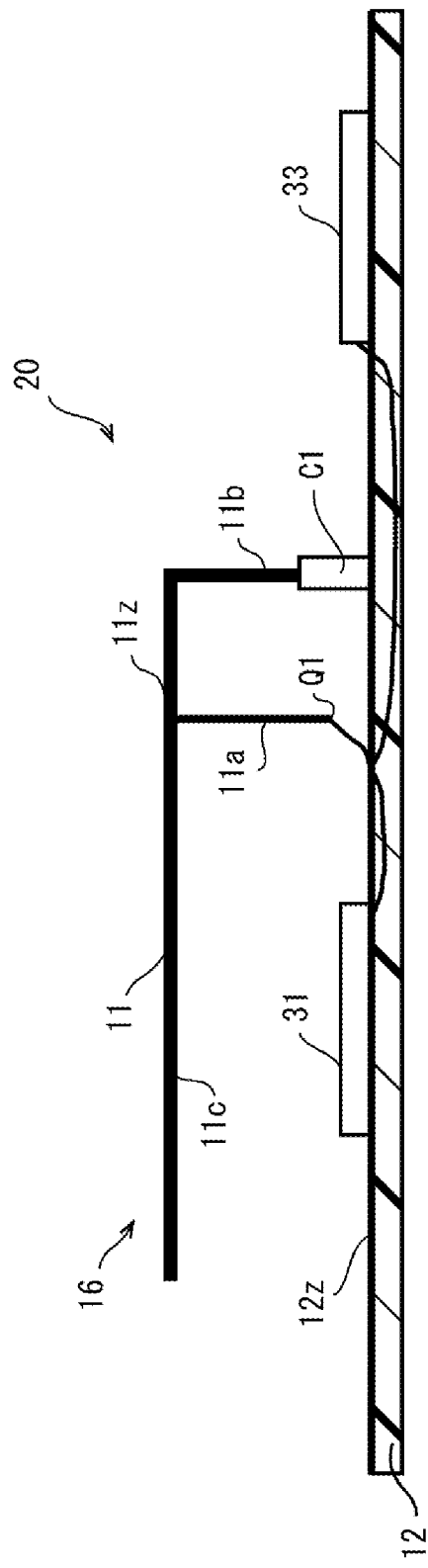
FIG. 4 is a schematic view outlining an example configuration of the earphone unit.

FIG. 4 is a schematic view outlining an example configuration of the earphone unit 20. In the earphone unit 20, the touch sensor and the wireless communication module of the wireless earphone 5 are provided as a single component. The earphone unit 20 includes at least the antenna/sensor unit 16, the wireless communication circuit 31, and the touch sensor control circuit 33. The antenna/sensor unit 16 functions as both of what is called an inverted-F antenna and the touch sensor. The wireless communication circuit 31 performs a wireless communication with the external device by a short-range wireless communication method (in this example, Bluetooth (registered trademark)) with the antenna/sensor unit 16. The touch sensor control circuit 33 detects a touch manipulation of, for example, a user finger using the antenna/sensor unit 16 as a capacitive touch sensor and performs one, corresponding to the detected touch manipulation, of various kinds of processing.

The antenna element 11, which is an example of the term "antenna unit," includes an antenna element main body 11c, a power supply line 11a, and a short stub 11b which is a transmission line serving as a line for short-circuiting to the ground conductor 12z; the antenna element 11 thus constitutes what is called an inverted-F antenna. The short stub 11b and a capacitor C1 (described later) constitute a series resonance circuit that is a short-length (low-height) member provided between the antenna element 11 and the ground conductor 12z to attain impedance matching for securing necessary antenna performance. The capacitor C1 having a prescribed capacitance exists between the short stub 11b and the ground conductor 12z. Since the series resonance circuit is formed by the short stub 11b and the capacitor C1 between the antenna element 11 and the ground conductor 12z, the impedance can be lowered in a wide band (e.g., 2.4-GHz band) at the time of transmission or reception of a radio signal and thereby makes it possible to secure necessary antenna performance.

Where the antenna/sensor unit 16 functions as an antenna for transmitting and receiving radio-frequency radio waves to be handled by Bluetooth (registered trademark), the capacitor C1 which is an example of a term "capacitance element" becomes a conductor at the radio frequency and short-circuits the antenna/sensor unit 16 to the ground conductor 12z at the radio frequency. To this end, the one end of the short stub 11b is electrically connected to the ground conductor 12z.

On the other hand, where antenna/sensor unit 16 functions as a touch sensor for detecting a user touch manipulation, the capacitor C1 stores a charge depending on the potential of the antenna/sensor unit 16 that is varied by a touch manipulation by a user finger, for example, and does not short-circuit the antenna/sensor unit 16 to the ground conductor 12z at a low frequency (or in DC). Thus, the touch sensor control circuit 33 can detect the touch manipulation made by, for example, the user finger on the basis of a variation of the capacitance using the antenna/sensor unit 16.

A signal line that is connected to one end of the power supply line 11a is connected to the wireless communication circuit 31 and another signal line that is connected to the one end of the power supply line 11a is connected to the touch sensor control circuit 33.

Figure 5:
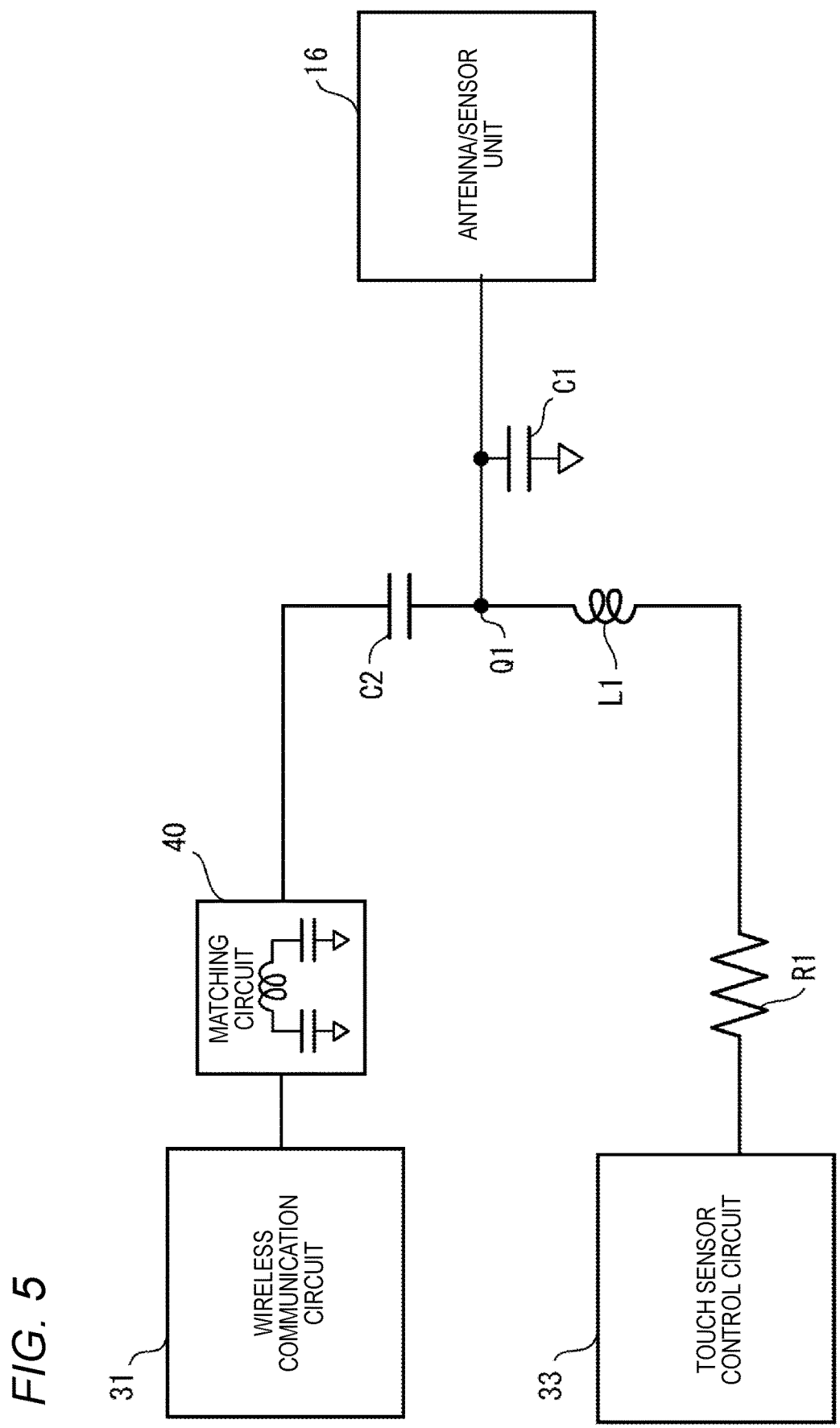
FIG. 5 is a circuit diagram showing an example configuration of the earphone unit.

FIG. 5 is a circuit diagram showing an example configuration of the earphone unit 20. A series connection of a matching circuit 40 and a capacitor C2 is connected between a power supply point Q1 that is located at the one end of the power supply line 11a and the wireless communication circuit 31.

The matching circuit 40, which is an example of a term "impedance matching circuit," is a circuit for matching the output impedance of the wireless communication circuit 31 to the input impedance of the antenna/sensor unit 16. The output impedance is set at a prescribed value (e.g., 50Ω) that is suitable to secure necessary antenna performance.

Where the antenna/sensor unit 16 is used as a touch sensor, the capacitor C2 stops a DC signal to be detected by the antenna/sensor unit 16 so that it does not flow to the wireless communication circuit 31.

A series connection of a resistance R1 and an inductor L1 is connected between the power supply point Q1 that is located at the one end of the power supply line 11a and the touch sensor control circuit 33.

The inductor L1 which is an example of a term "inductance element" shows a high impedance for a radio signal. Thus, the inductor L1 stops a radio signal generated by the wireless communication circuit 31 so that a radio signal generated by the wireless communication circuit 31 does not flow to the touch sensor control circuit 33. The resistance R1 and the capacitor C1 form a time constant circuit.

Figure 6:
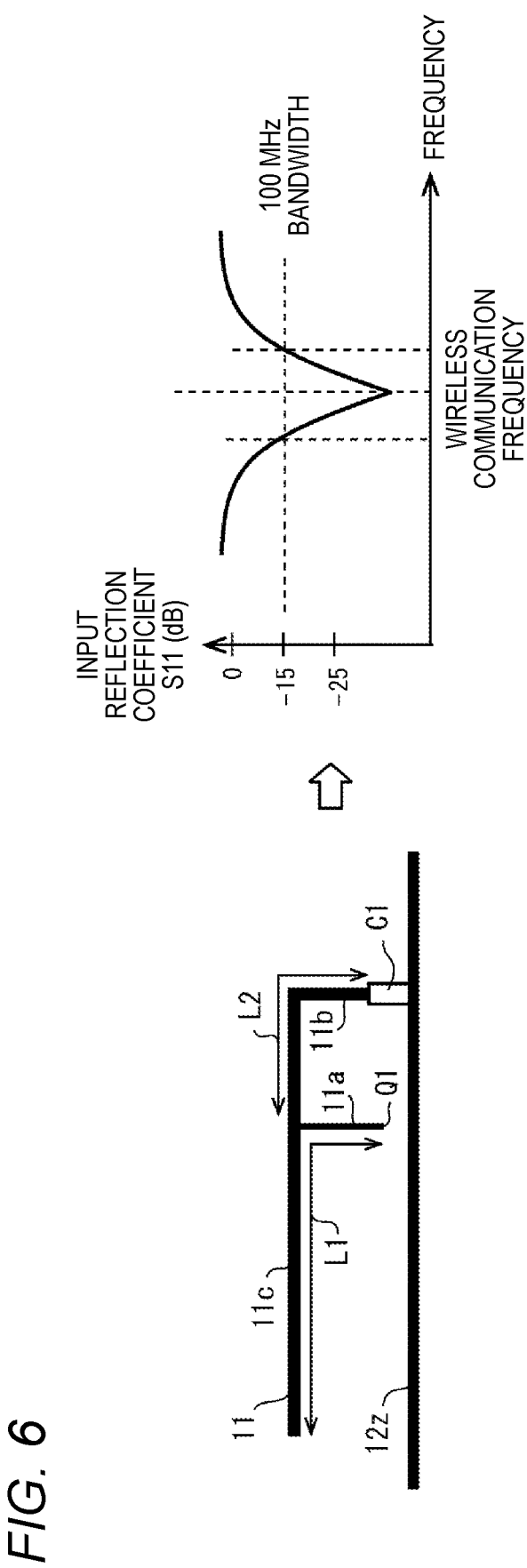
FIG. 6 is a diagram and a graph showing an example basic configuration and an example characteristic of an inverted-F antenna.

FIG. 6 is a diagram and a graph showing an example basic configuration and an example characteristic of the inverted-F antenna. Where the antenna/sensor unit 16 is used as what is called an inverted-F antenna, dimensions of the antenna element 11 are set so as to satisfy the following Inequalities (1):

> Antenna element length $L1$: $\lambda/8 < L1 < \lambda 3$
>
> Stub element length $L2$: $L2 < \lambda/8$
>
> Coupling capacitance $x$: $0.5 \text{ pF} < x < 100 \text{ pF}$ (1)

In Inequalities (1), the antenna element length L1 is the distance from the power supply point Q1 to the tip of the antenna element 11 (see FIG. 6), the stub element length L2 is the length of the short stub 11b (see FIG. 6), and the coupling capacitance x is the capacitance of the capacitor C1.

In the characteristics of the inverted-F antenna, the input reflection coefficient S11 represents the ratio of a signal reflected by the input terminal to a signal that is input to the input terminal. The radio wave radiation efficiency becomes higher as the input reflection coefficient S11 decreases. In the characteristic diagram of FIG. 6, the input reflection coefficient S11 has a steep drop to a value that is smaller than −25 dB in a wireless communication frequency band (e.g., the 2.4-GHz band which is the assumed operation frequency band of Bluetooth (registered trademark)). A frequency range (bandwidth) in which the input reflection coefficient S11 is smaller than −15 dB and is suitable for antenna use in the 2.4-GHz band is as wide as 100 MHz.

Comparative Example 1

Figure 7:
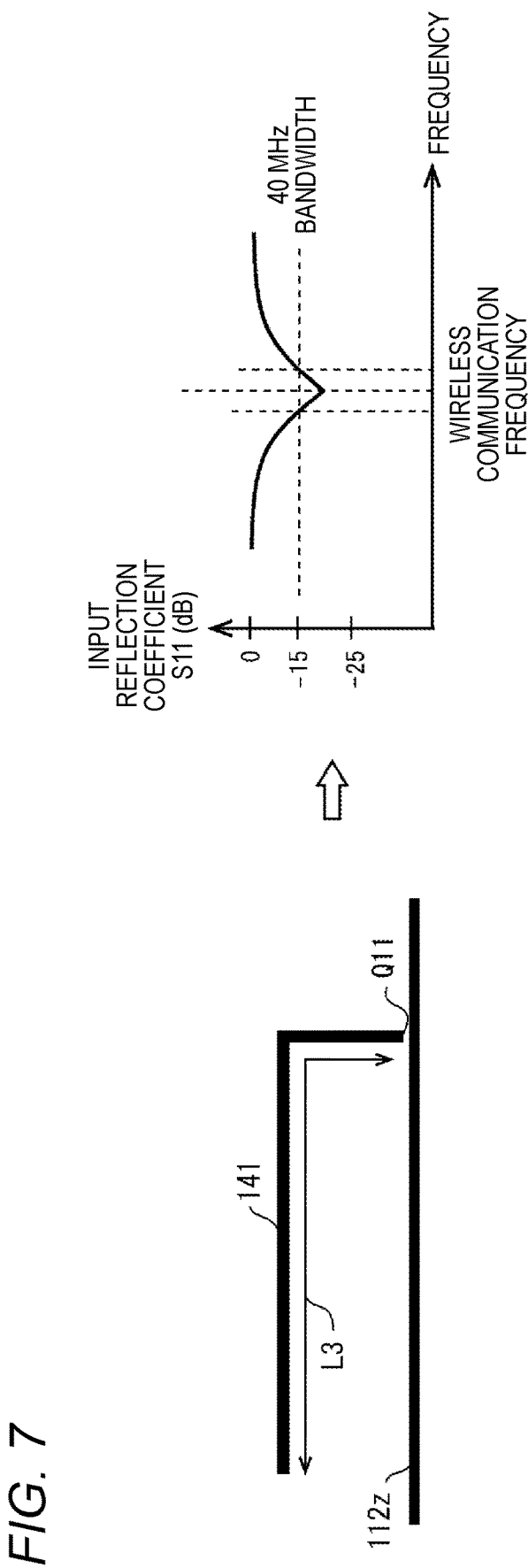
FIG. 7 is a diagram and a graph showing a basic configuration and an example characteristic of an inverted-L antenna of Comparative Example 1.

FIG. 7 is a diagram and a graph showing a basic configuration and an example characteristic of an inverted-L antenna of Comparative Example 1. In this inverted-L antenna, an antenna conductor 141 is formed so as to assume an inverted-L shape with respect to a ground conductor 112z so that the distance to the ground conductor 112z is shortened. The antenna element length L3 is the distance from the power supply point Q1 that is defined on the surface of a ground conductor 112z to the tip of the antenna element (see FIG. 7).

In the characteristic of the inverted-L antenna (see the characteristic graph shown in FIG. 7), the input reflection coefficient S11 does not dip to a large extent, that is, dips to −17 dB that is not smaller than in the case of the inverted-F antenna, in a wireless communication frequency band (e.g., 2.4-GHz band). A frequency range (bandwidth) in which the input reflection coefficient S11 is smaller than −15 dB and is suitable for antenna use in the 2.4-GHz band is as narrow as 40 MHz.

Figure 8:
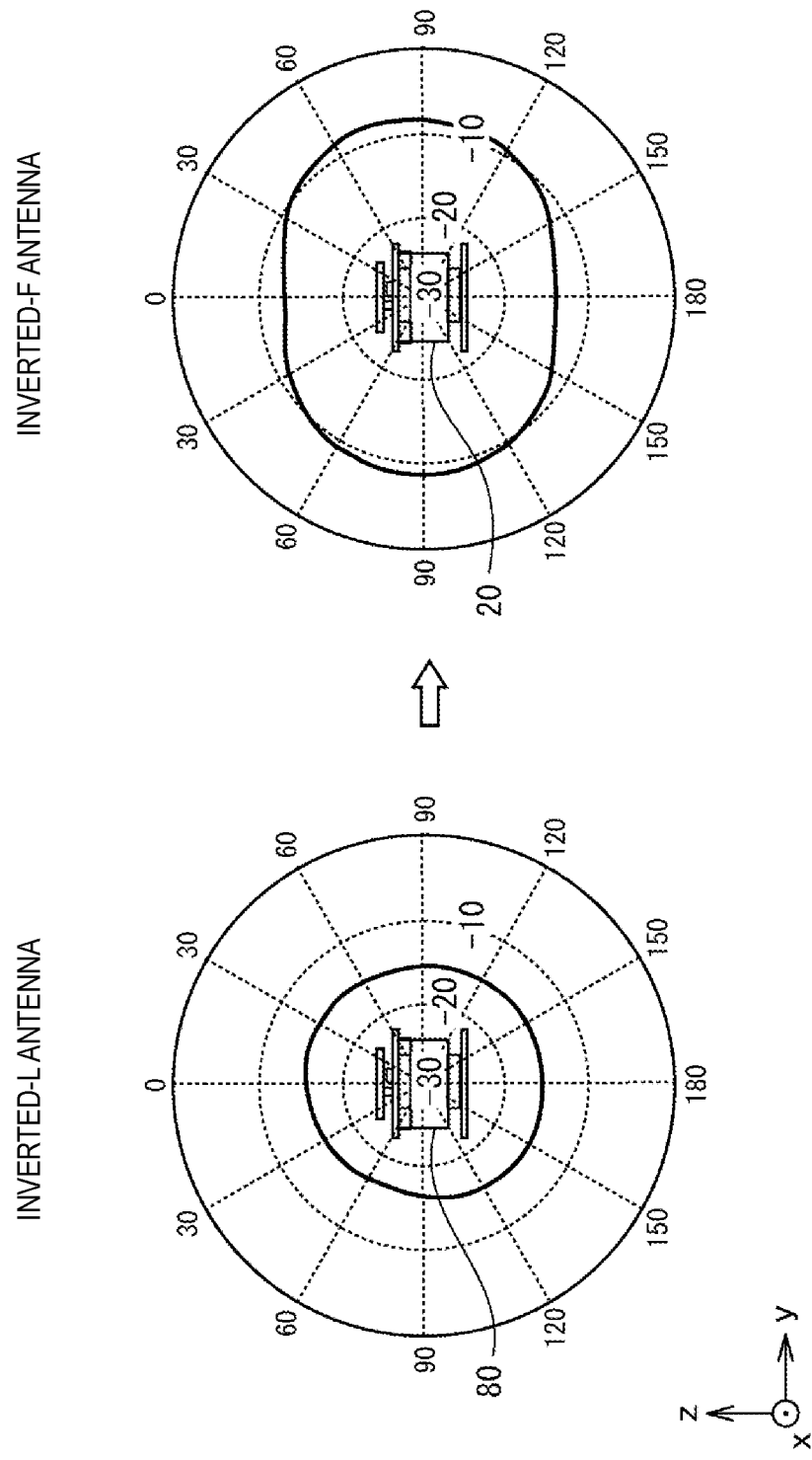
FIG. 8 is graphs showing a directivity characteristic example of the inverted-F antenna employed in the embodiment and a directivity characteristic example for comparison of the inverted-L antenna of Comparative Example 1.

FIG. 8 is graphs showing a directivity characteristic example of the inverted-F antenna employed in the first embodiment and a directivity characteristic example for comparison of the inverted-L antenna of Comparative Example 1. Each directivity characteristic shows antenna gains in directions in the plane (YZ plane) that is perpendicular to the surface of the antenna conductor.

In an earphone unit 80 having the inverted-L antenna of Comparative Example 1, the antenna gain has an approximately constant value of about −16 dB in the angular range 0° to 360° in the YZ plane.

On the other hand, in the earphone unit 20 according to the first embodiment having the inverted-F antenna, in the angular range 0° to 360° in the YZ plane, the antenna gain is in a range of −10 to −14 dB which is larger than in the inverted-L antenna of Comparative Example 1. Furthermore, the antenna gain has particularly large values of larger than −9 dB in angular directions 0° and 90° in which the start point and the end point of the antenna conductor forming a meander line are located. As such, in the inverted-F antenna, in the angular directions 0° and 90°, the antenna gain is higher than in the inverted-L antenna by 7 dB, whereby the radio wave radiation efficiency of the antenna element 11 of the inverted-F antenna is increased. As a result, a good wireless communication can be performed between the wireless earphone 5 and the external device, which allows the user to easily listen to a musical piece reproduced by the external device and to manipulate the external device easily.

The directivity characteristic of the antenna gain in the plane (XY plane) that is parallel with the surface of the antenna conductor has the same tendency as shown in FIG. 8.

As described above, in the wireless earphone 5 according to the first embodiment, the antenna element 11 can also serve as the sensor element (the electrode of the touch sensor). Thus, the wireless communication module and the touch sensor that are electronic components provided in the case 10z of the wireless earphone 5 can be implemented as a single component.

Furthermore, in the wireless earphone 5, the discontinuous evaporation metal is formed as the exterior 18 on the outer surface of the case 10z. Thus, the portion, to be exposed from the earhole, of the wireless earphone 5 is a dielectric though it has a metallic gloss that is superior in aesthetic appearance (design). This makes it possible to suppress reduction of a capacitance variation that occurs when a user finger comes close to the touch sensor. Still further, since the discontinuous evaporation metal is such that metal is dispersed on the surface of a hard resin member, the exterior 18 is not regarded as a metal mass in an electromagnetic sense. As a result, the exterior 18 does not obstruct transmission or reception of radio waves by the antenna element 11 and hence does not impair the antenna performance.

Modification of Embodiment 1

FIG. 9 is a perspective view and a graph showing an example appearance and an example characteristic of an earphone unit 120 according to Modification of the first embodiment. In an antenna/sensor unit 116 of the earphone unit 120, as in the antenna/sensor unit 16 of the earphone unit 20 according to the first embodiment, an antenna element also serves as a sensor element and forms an inverted-F antenna. The antenna/sensor unit 116 has an antenna element 111 that forms a meander line and has a circular outline. The antenna element 111 includes a power supply line 111a which is connected to a power supply point Q1 and a short stub 111b. The short stub 111b is connected to a ground conductor 12z via a capacitor C11.

The characteristic graph of the antenna element of the earphone unit 120 according to Modification of the first embodiment shows how the input reflection coefficient S11 varies. The input reflection coefficient S11 has a lower-limit peak that is smaller than or equal to −30 dB in a wireless communication frequency band (2.4-GHz band). A band in which the input reflection coefficient S11 is smaller than −15 dB is as wide as 100 MHz.

FIG. 10 shows an example directivity characteristic of the antenna element shown in FIG. 9. In the earphone unit 120, as in the earphone unit 20, the antenna gain is in a range of −10 to −14 dB in the angular range 0° to 360° in the YZ plane. Furthermore, the antenna gain has particularly large values of larger than −9 dB in angular directions 0° and 90° in which the start point and the end point of the antenna conductor forming a meander line are located.

Comparative Example 2

FIG. 11 is a perspective view and a graph showing an example appearance and an example characteristic of an earphone unit 150 according to Comparative Example 2. The earphone unit 150 constitutes an antenna-touch sensor separation type wireless earphone. The earphone unit 150 has an antenna element 151 and a touch sensor 152. The antenna element 151 is separated from the touch sensor 152 and forms an inverted-F antenna.

The touch sensor 152 is shaped like a circular disc. The touch sensor 152 includes a signal line 152a which is connected to the bottom board 14. The antenna element 151 is shaped like a ring so as to surround the touch sensor 152. The antenna element 151 includes a short stub 151b and a power supply line 151a which is connected to the power supply point Q1. The short stub 151b is directly connected to the ground conductor 12z.

The input reflection coefficient S11 has a lower-limit peak of about −26 dB in a wireless communication frequency band (2.4-GHz band). A band in which the input reflection coefficient S11 is smaller than −15 dB has a width 70 MHz which is narrower than in the earphone unit 120 according to Modification.

FIG. 12 shows an example directivity characteristic of the antenna element 151 shown in FIG. 11. In the earphone unit 150, the antenna gain has small values of about −16 dB in the angular range 0° to 360° in the YZ plane though being larger than in the case of the inverted-L antenna (see FIG. 8).

As described above, in the earphone unit 120 according to Modification of the first embodiment, the band in which the input reflection coefficient S11 is smaller than −15 dB is wider (100 MHz) than in the earphone unit 150 of Comparative Example 2 (70 MHz) by 30%. Thus, the wireless communication frequency band (2.4-MGHz band) can be widened. Furthermore, assuming that the radiation efficiency is 100%, the radiation efficiency of the earphone unit 120 according to Modification is higher than that of the earphone unit 150 of Comparative Example 2 by 50%.

As described above, the wireless earphone 5 according to the first embodiment includes the antenna/sensor unit 16 which serves as both of the antenna element 11 configured to transmit and receive a radio signal wirelessly to and from an external device such as a smartphone or a portable music player and the sensor unit 11z configured to receive a touch manipulation of a user. The wireless earphone 5 is also includes the wireless communication circuit 31 configured to perform various kinds processing relating to the radio signal, and the touch sensor control circuit 33 configured to perform various kinds processing on the basis of the touch manipulation made by a finger of the user. The wireless earphone 5 further includes the capacitor C1 connected between the wireless communication circuit 31 and the antenna/sensor unit 16 and between the touch sensor control circuit 33 and the antenna/sensor unit 16, the capacitor C1 being connected to the ground conductor 12z in series to pass only the radio signal.

Configured as described above, in the wireless earphone 5, the antenna/sensor unit 16 can serve as both of the antenna element 11 that transmits and receives a radio signal wirelessly to and from an external device such as a smartphone or a portable music player and the sensor unit 11z capable of receiving a touch manipulation of a user in the form of a DC signal. That is, in the wireless earphone 5, the antenna element 11 can be used as the electrode of the touch sensor. Thus, in the wireless earphone 5, electronic components including the wireless communication module and the touch sensor can be disposed in a narrow space in the case 10z so as to enable shared use. Furthermore, the wireless earphone 5 can suppress increase of the number of components and the number of assembling steps.

The wireless earphone 5 further includes the stub (e.g., short stub 11b) having a prescribed length and connected to the antenna conductor of the antenna element 11. Whereas the capacitor C1 connects the one end of the short stub 11b to the ground conductor 12z, it interrupts signal passage in DC. With this measure, in the wireless earphone 5, the antenna characteristics can be improved by providing the short stub 11b and the short stub 11b can be prevented from being coupled with the ground conductor 12z in DC. As a result, the antenna/sensor unit 16 can detect a capacitance variation caused by a touch by a user finger and thereby detect a touch manipulation properly.

The antenna conductor of the antenna element 11 forms a meander line. With this measure, in the wireless earphone 5, the length of the antenna element 11 can be adjusted to a proper length and a touch surface having such a surface area as to be touched by a user finger can be secured by a line-shaped antenna conductor. Manipulation by a user finger can thus be made easier.

The wireless earphone 5 further includes the inductor L1 connected between the touch sensor control circuit 33 and the antenna/sensor unit 16 in series. In the wireless earphone 5, this measure prevents a phenomenon that a radio signal is input to the touch sensor control circuit 33, causes a capacitance variation, and renders a touch sensor control unstable.

The antenna element 11 forms an inverted-F antenna by the antenna element main body 11c, the power supply line 11a, and the short stub 11b. With this measure, the distance between the antenna conductor and the ground conductor 12z is made shorter and they are coupled strongly, whereby the antenna characteristics are less prone to be varied by the shape and size of the ground conductor 12z. In addition, the input/output impedance of the antenna can be controlled easily.

The antenna element 11 further includes the matching circuit 40 connected to the wireless communication circuit 31 in series. With this measure, in the wireless earphone 5, the input/output impedance of the wireless communication circuit 31 can be matched with the impedance of the antenna element 11. Thus, the antenna characteristics of the wireless earphone 5 can be improved.

The wireless earphone 5 further includes the case 10z. The antenna/sensor unit 16 has a substantially circular disc shape, and the antenna/sensor unit 16 is disposed close to the inner surface of a portion of the case 10z, the portion being exposed outside an earhole (e.g., external ear) of the user when the wireless earphone 5 is set in the earhole. This measure allows the user to easily manipulate, with a finger, the antenna/sensor unit 16 of the wireless earphone 5 being set in the earhole. Manipulation by the user finger can thus be made easier.

Discontinuous evaporation metal is formed on an outer surface of the case 10z at the portion exposed outside an external ear of the user. With this measure, though having a metallic gloss that is superior in aesthetic appearance (design), the exterior formed on that portion of the outside surface of the case 10z can be regarded as a dielectric in an electromagnetic sense because metal is evaporated dispersively rather than on the whole of that portion and hence does not impair the antenna performance.

Although the various embodiments have been described above with reference to the drawings, it goes without saying that the disclosure is not limited to the embodiments. It is apparent that those skilled in the art could conceive various changes, modifications, replacements, additions, deletions, or equivalents within the confines of the claims, and they are naturally construed as being included in the technical scope of the disclosure. Further, each element of the above-described various embodiments may be combined without departing from the scope of the invention.

The disclosure is useful because it makes it possible to provide a wireless communication module and a touch sensor as a single component in a limited space in the case of a wireless earphone.

The invention claimed is:

1. A wireless earphone comprising:
    an antenna sensor which serves as both of an antenna element configured to transmit and receive a radio signal wirelessly to and from an external device and a capacitive touch sensor configured to receive an input operation by a wearer;
    a radio circuit configured to perform various kinds of processing relating to the radio signal; and
    a control circuit configured to perform various kinds of processing on the basis of the input operation;
    wherein,
    the antenna element includes a main body, a power supply line, and a stub;
    one end of the power supply line and one end of the stub are connected to one end of the main body;
    another end of the power supply line forming a power supply point is connected to the radio circuit and to the control circuit; and
    another end of the stub is connected, via a first capacitor, to a ground conductor.

2. The wireless earphone according to claim 1,
    wherein an antenna conductor of the antenna element forms a meander line.

3. The wireless earphone according to claim 1,
    wherein a series connection of a resistor and an inductor is connected between the power supply point and the control circuit.

4. The wireless earphone according to claim 1,
    wherein the antenna element forms an inverted-F antenna with an antenna conductor of the antenna element and the stub.

5. The wireless earphone according to claim 1, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

6. The wireless earphone according to claim 5,
    wherein metal is dispersively evaporated on an outer surface of the case at the portion exposed outside the external ear.

7. The wireless earphone according to claim 1,
    wherein a series connection of an impedance matching circuit and a second capacitor is connected between the power supply point and the radio circuit.

8. The wireless earphone according to claim 2,
    wherein a series connection of an impedance matching circuit and a second capacitor is connected between the power supply point and the radio circuit.

9. The wireless earphone according to claim 2,
    wherein a series connection of a resistor and an inductor is connected between the power supply point and the control circuit.

10. The wireless earphone according to claim 7,
    wherein a series connection of a resistor and an inductor is connected between the power supply point and the control circuit.

11. The wireless earphone according to claim 8,
    wherein a series connection of a resistor and an inductor is connected between the power supply point and the control circuit.

12. The wireless earphone according to claim 2,
    wherein the antenna element forms an inverted-F antenna with an antenna conductor of the antenna element and the stub.

13. The wireless earphone according to claim 3,
    wherein the antenna element forms an inverted-F antenna with an antenna conductor of the antenna element and the stub.

14. The wireless earphone according to claim 7,
    wherein the antenna element forms an inverted-F antenna with an antenna conductor of the antenna element and the stub.

15. The wireless earphone according to claim 8,
    wherein the antenna element forms an inverted-F antenna with an antenna conductor of the antenna element and the stub.

16. The wireless earphone according to claim 2, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

17. The wireless earphone according to claim 3, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

18. The wireless earphone according to claim 4, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

19. The wireless earphone according to claim 7, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

20. The wireless earphone according to claim 8, further comprising:
    a case,
    wherein the antenna sensor has a substantially circular disc shape, and the antenna sensor is disposed close to an inner surface of a portion of the case, the portion being exposed outside an external ear of the wearer when the wireless earphone is set in the external ear.

* * * * *